United States Patent [19]
Schütz et al.

[11] 4,110,769
[45] Aug. 29, 1978

[54] COUPLING MECHANISM FOR THE ALTERNATE MANUAL AND AUTOMATIC ADJUSTMENT OF A VARIFOCAL OBJECTIVE

[75] Inventors: Karl-Heinz Schütz; Karl Tesch, both of Bad Kreuznach, Fed. Rep. of Germany

[73] Assignee: Jos. Schneider & Co. Optische Werke Kreuznach, Bad Kreuznach, Fed. Rep. of Germany

[21] Appl. No.: 789,228

[22] Filed: Apr. 20, 1977

[30] Foreign Application Priority Data

Apr. 21, 1976 [DE] Fed. Rep. of Germany ....... 2617464

[51] Int. Cl.$^2$ .......................... G02B 7/10; G03B 3/02
[52] U.S. Cl. ...................... 354/195; 350/75; 350/187
[58] Field of Search .................. 352/140; 350/40, 75, 350/247, 76, 254, 255, 257, 187, 184; 354/195, 289

[56] References Cited

U.S. PATENT DOCUMENTS

| 3,095,794 | 7/1963 | Raab ........................................ 350/75 |
| 3,224,351 | 12/1965 | Strasser ................................... 350/76 |
| 3,582,188 | 6/1971 | Rau et al. ........................ 350/187 X |
| 4,057,327 | 11/1977 | Kumazawa ..................... 354/195 X |

*Primary Examiner*—Donald A. Griffin
*Attorney, Agent, or Firm*—Karl F. Ross

[57] ABSTRACT

A camming sleeve for the adjustment of the shiftable components of a varifocal objective is fixed to a surrounding coaxial control ring having a slot traversed by a knob which is rigid with a slider received in a recess between the control ring and the sleeve. The slider, which is indexable in two different axial positions, has a toothed edge engageable in one of these positions with a toothed face of a coupling ring, permanently connected via a step-down transmission with a reversible drive motor, which in the other slider position is freely rotatable on the camming sleeve so that the latter can be manually displaced by means of a handle rigid therewith.

4 Claims, 2 Drawing Figures

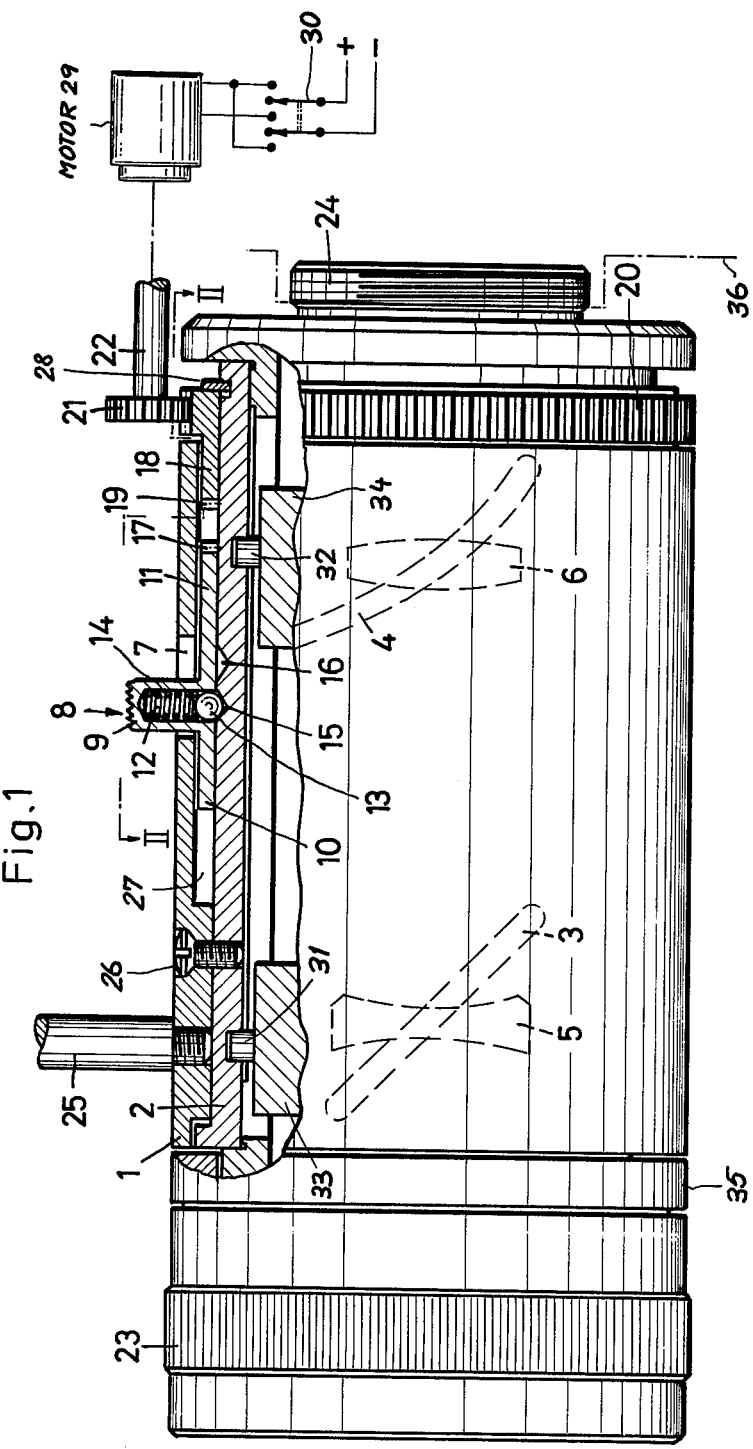

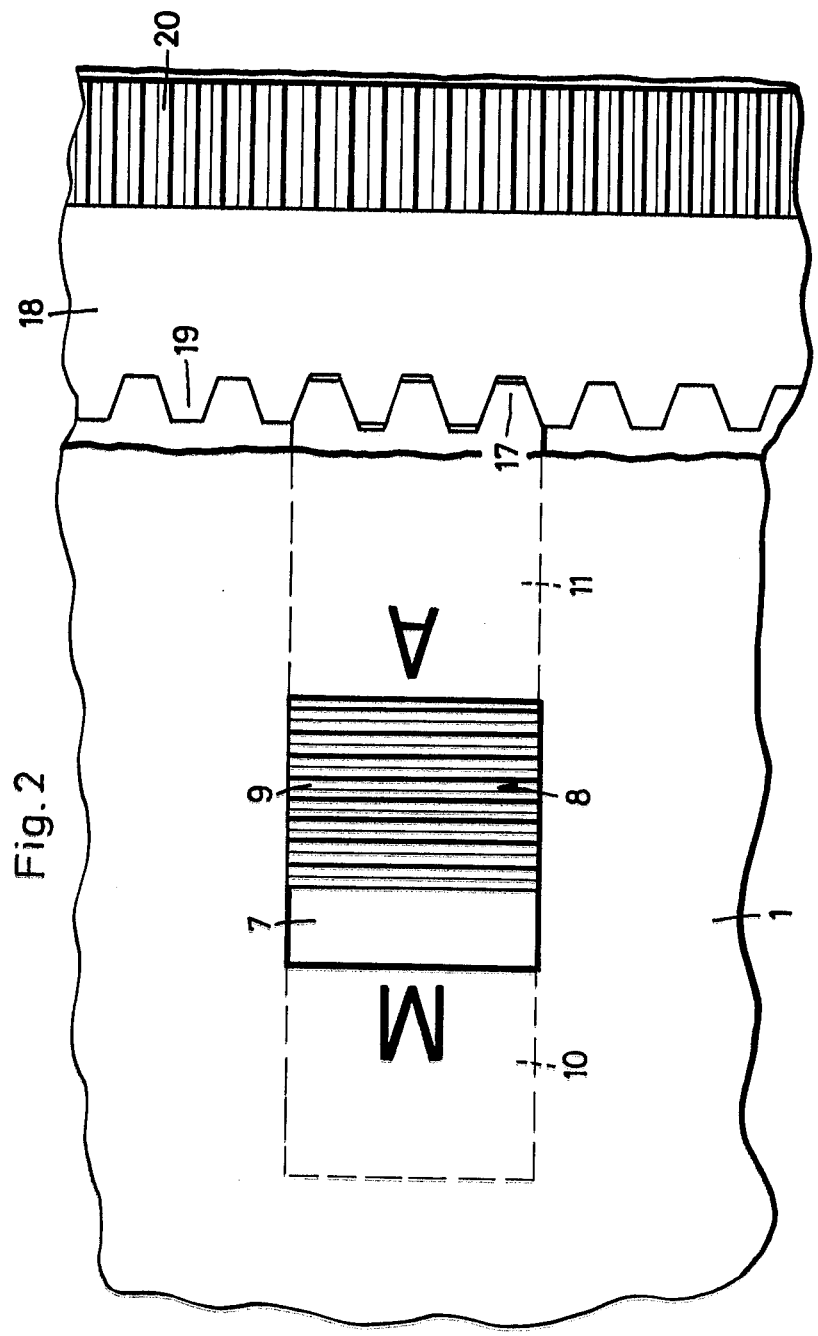

COUPLING MECHANISM FOR THE ALTERNATE MANUAL AND AUTOMATIC ADJUSTMENT OF A VARIFOCAL OBJECTIVE

FIELD OF THE INVENTION

Our present invention relates to a photographic, cinematographic or television camera with a varifocal objective whose axially shiftable components can be adjusted either manually or automatically with the air of a rotatable camming sleeve centered on the objective axis.

BACKGROUND OF THE INVENTION

In commonly owned U.S. Pat. No. 3,095,794 there has been described a camera of this type in which a handle is shiftable in an objective housing between a "manual" position and an "automatic" position; a camming sleeve for the adjustment of the overall focal length is coupled with a reversible drive motor in the "automatic" position and is decoupled from that motor in the "manual" position in which the sleeve can be rotated by the handle. In a later U.S. Pat. No. 3,224,351, a rotary knob can be similarly shifted on an objective housing for selective manual or automatic adjustment. In both these instances the manual/automatic selector, i.e. the handle or knob, is decoupled from the sleeve in the "automatic" position and therefore does not participate in its rotation by the motor; thus, the selector position is not related to focal length and a separate indicator must be provided to inform the user of the position last reached by the camming sleeve.

German Pat. No. 2,345,078 describes a varifocal objective or zoom lens in which the drive motor rotates the camming sleeve through a gear train, acting as a step-down transmission, and can be decoupled therefrom by the separation of two gears of that train. Upon such decoupling, the sleeve can be manually rotated by a lever or the like not illustrated in that German patent. Since the manual adjustment entails the entrainment of several meshing gears of the step-down transmission, the user must overcome an added frictional resistance. Also, because of the unavoidable play of the gear teeth, a false impression of a defective mechanism may be created.

OBJECT OF THE INVENTION

The object of our present invention, therefore, is to provide means in such a camera for the selective changeover from manual to automatic adjustment or vice versa anywhere within the varifocal range and with a minimum of encumbrance in the manual position.

SUMMARY OF THE INVENTION

In accordance with our present invention, a control ring surrounding the camming sleeve is partly separated from that sleeve by an intervening clearance communicating with an axially extending slot of that ring. A slider axially displaceable in the clearance, provided with indexing means for yieldably representing manual and automatic operation, has an extension which passes outwardly through the slot of the ring to form a knob or other element manipulable by the user. A coupling ring coaxial with the camming sleeve has a toothed face confronting a toothed edge of the slider which is engageable with that toothed face in the "automatic" position but is disenaged therefrom in the "manual" position. In the "automatic" position, the sleeve is reversibly rotatable by drive means operatively connected with the coupling ring, advantageously through step-down transmission including a pinion in permanent mesh with a set of gear teeth on this ring. In the "manual" position, such rotation can be performed by a handle on the control ring.

BRIEF DESCRIPTION OF THE DRAWING

The above and other features of our invention will now be described in detail with reference to the accompanying drawing in which:

FIG. 1 is a side-elevational view, partly in section, of a lens mounting for a camera embodying our invention; and FIG. 2 is a fragmentary top view taken on the line II — II of FIG. 1 and drawn to a larger scale.

SPECIFIC DESCRIPTION

In FIG. 1 we have shown a varifocal or zoom objective comprising a control ring 1 that is manually rotatable, with the aid of a handle 25, about the objective axis and coaxially surrounds a sleeve 2 with which it is rigidly connected by screws 26 (only one shown). Sleeve 2 is formed with a pair of camming grooves 3 and 4 engaged by pins 31 and 32 on respective lens mounts 33 and 34 which are axially shiftable therein and carry components 5 and 6 of the objective designed to vary its overall focal length. A short, axially extending slot 7 in ring 1 communicates with a clearance 27 existing between that ring and the carrying sleeve 2, that clearance being here formed by a recess in the inner peripheral surface of the ring. A slider 8 has a knob 9 projecting outwardly through slot 7 and is guided by front and rear legs 10 and 11 integral therewith, these legs being received in clearance 27. As shown in FIG. 2, knob 9 is shiftable within slot 7 between a forward position marked M (for "manual") and a rear position marked A (for "automatic"); two depressions 15 and 16 in the outer surface of sleeve 2 coact with detent in a bore 14 of knob 9, i.e. a ball check 13 loaded by a spring 12, for yieldably arresting the slider 8 in either of these positions. Depressions 15 and 16 could be small dimples but may also be in the form of parallel peripheral grooves.

Leg 11 of slider 8 has a toothed edge 17 which, in "automatic" position A, engages a confronting toothed face 19 of a coupling ring 18 coaxially surrounding the rear end of sleeve 2 on which ring 18 is freely rotatable, being held against rearward displacement by a jump ring 28. Coupling ring 18 has a set of peripheral gear teeth 20 in permanent mesh with a pinion 21 whose shaft 22 can be reversibly driven by a motor 29. A manual switch 30 in the energizing circuit of that motor has two operating positions for forward and reverse rotation, respectively.

Rings 1 and 18 as well as sleeve 2 are carried on a lens barrel 35 which is also provided with the usual setting ring 23 for focusing purposes. A rear flange 24 on lens barrel 35 allows the latter to be removably secured to a camera housing 36 indicated only diagrammatically.

As will be readily apparent, an indexing of slider 8 in its "automatic" position A allows the focal length of the objective to be reduced or increased by the zoom drive 20 - 22, 29 under the control of three-position switch 30; ring 1, handle 25 and slider 8 participate in the rotation of camming sleeve 2. In the "manual" position M, handle 25 allows the assembly 1, 2, 8 to be rotated without entrainment of ring 18 or pinion 21. The established focal length can be ascertained in either case by the angular position of handle 25 as read, for example, on a stationary scale engraved on lens barrel 35.

In principle, the clearance 27 could also be formed by a recess in the outer surface of sleeve 2. Moreover, the ball check 12, 13 or equivalent indexing means could be located elsewhere in the assembly, though the illustrated arrangement is particularly advantageous for its compactness.

The use of a coupling ring 18 (whose diameter substantially equals that of lens barrel 35) as part of a step-down transmission between motor 29 and sleeve 2 eliminates the need for a multistage gear train of the type shown in the aforementioned German Pat. No. 2,345,078.

We claim:

1. In a camera provided with a varifocal objective having components shiftable along an optical axis with the aid of a camming sleeve centered on said axis, the combination therewith of:

a control ring surrounding said sleeve, said control ring being partly separated from said sleeve by an intervening clearance and having an axially extending slot communicating with said clearance;

a slider axially displaceable in said clearance and provided with indexing means for yieldably arresting it in either of two axially spaced positions, said slider having an extension passing outwardly through said slot for manipulation by a user;

a coupling ring coaxial with said sleeve having a toothed surface confronting said slider, the latter having a toothed edge engageable with said toothed face in one of said positions but disengaged therefrom in the other of said positions; and automatic drive means operatively connected with said coupling ring for reversibly rotating said sleeve through the intermediary of said slider in said one of said positions, said control ring being provided with handle means enabling manual rotation of said sleeve in said other of said positions.

2. The combination defined in claim 1 wherein said coupling ring is rotatably mounted on said sleeve.

3. The combination defined in claim 1 wherein said automatic drive means comprises a reversible motor connected with said coupling ring through a step-down transmission including a pinion in permanent mesh with a set of gear teeth on said coupling ring.

4. The combination defined in claim 1 wherein said extension is a knob provided with a bore open toward said sleeve, said indexing means comprising a ball check in said bore engageable with coacting formations on said sleeve.

* * * * *